(12) United States Patent
Canu et al.

(10) Patent No.: US 8,615,491 B2
(45) Date of Patent: Dec. 24, 2013

(54) ARCHIVING TOOL FOR MANAGING ELECTRONIC DATA

(75) Inventors: Marco Canu, Rome (IT); Sandro Piccinini, Rome (IT); Luigi Pichetti, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1299 days.

(21) Appl. No.: 12/178,487

(22) Filed: Jul. 23, 2008

(65) Prior Publication Data

US 2009/0094297 A1    Apr. 9, 2009

(30) Foreign Application Priority Data

Oct. 8, 2007    (EP) .................................... 07118026

(51) Int. Cl.
    *G06F 17/30*    (2006.01)
(52) U.S. Cl.
    CPC .............................. *G06F 17/30221* (2013.01)
    USPC ........................................ 707/640; 707/661
(58) Field of Classification Search
    USPC ................... 707/640, 646, 661; 709/220, 227
    See application file for complete search history.

(56) References Cited

U.S. PATENT DOCUMENTS

| | | | |
|---|---|---|---|
| 5,732,214 A * | 3/1998 | Subrahmanyam | 709/227 |
| 6,078,933 A * | 6/2000 | Szalwinski | 707/640 |
| 6,609,138 B1* | 8/2003 | Merriam | 707/640 |
| 7,426,541 B2* | 9/2008 | McCown | 709/206 |
| 7,529,816 B2* | 5/2009 | Hayden et al. | 709/220 |
| 2003/0208608 A1* | 11/2003 | Merriam | 709/229 |
| 2005/0267920 A1* | 12/2005 | Helliker et al. | 707/640 |
| 2010/0179943 A1* | 7/2010 | Anand et al. | 707/646 |

FOREIGN PATENT DOCUMENTS

| | | | | | |
|---|---|---|---|---|---|
| EP | 1035690 A2 * | 9/2000 | | G06F 17/60 |
| EP | 1631023 A1 * | 3/2006 | | H04L 12/58 |
| WO | WO 2006/029134 A2 * | 3/2006 | | G06F 15/16 |

* cited by examiner

*Primary Examiner* — Shahid Alam

(74) *Attorney, Agent, or Firm* — Nelson and Nelson; Daniel P. Nelson; Alexis V. Nelson

(57) ABSTRACT

A method for storing electronic data in a network including a server and at least two client machines. Electronic data may be archived in a predetermined location of a client machine. A local archiving list may be generated on the client machine and may include descriptive properties of the electronic data, as well as the predetermined location. The local archiving list may be transmitted from the client machine to the server to generate a global archiving list, which may then be transmitted to any other client machines in communication with the server. In this manner, each client machine in the network may store the location and descriptive properties of the archived electronic data to facilitate electronic data recovery.

20 Claims, 3 Drawing Sheets

ARCHIVING TOOL FOR MANAGING ELECTRONIC DATA

BACKGROUND OF THE INVENTION

Related Applications

This application claims priority to European Patent No. 07118026, filed on Oct. 8, 2007, and entitled "Method and System for Improving Archiving of Electronic Documents."

DESCRIPTION OF THE RELATED ART

A main server in a company is often used to transmit emails from or to electronic devices, such as personal computers of users. As soon as a user needs to archive specific emails, one or more servers can store and archive these emails.

Despite the fact that storage capability is increasing, however, it is still possible to reach a maximum storage capacity. In such a case, users may have to store emails on their own personal computers or laptops for archival purposes. Users, however, often have more than one personal computer, or a personal computer and a laptop, or other electronic devices. As a result, users may have emails archived at different physical locations, and may encounter problems when looking for a specific archived email without knowing the correct archive location.

Further, users may need to retrieve a specific email relating to a specific subject. Presently, users are required to search among all archived emails relating to several subjects to locate the particular email.

In view of the foregoing, what are needed are tools for archiving electronic data that facilitate locating previously archived electronic files and other electronic data. Beneficially, such tools would facilitate identifying particular archived electronic files and data based on their particular properties and characteristics. Such tools are described and claimed herein.

SUMMARY OF THE INVENTION

Embodiments of the invention have been developed to provide improved tools for archiving electronic data that create a global archiving list and communicate the list to other machines.

Consistent with the foregoing, this disclosure is directed to a method for archiving electronic data in a network comprising a server communicating with at least two client machines. The method may include archiving the electronic data in a predetermined location of a client machine, and generating a local archiving list on the client machine. The local archiving list may include descriptive properties of the electronic data, as well as the predetermined location.

The local archiving list may be transmitted from the client machine to the server to generate a global archiving list on the server. The global archiving list may then be transmitted to other client machines in communication with the server. In this manner, each client machine in the network may store the location and descriptive properties of the archived electronic data to facilitate electronic data recovery.

A corresponding system and computer program product for implementing the above-stated method are also disclosed and claimed herein.

BRIEF DESCRIPTION OF THE DRAWINGS

Some aspects of embodiments of the invention will now be described with reference to the drawings, in which.

DETAILED DESCRIPTION OF THE INVENTION

It will be readily understood that components of embodiments of the invention, as generally described and illustrated in the Figures herein, may be arranged and designed in a wide variety of different configurations. Thus, the following more detailed description of the embodiments of the invention, as represented in the Figures, is not intended to limit the scope, but is merely representative of selected embodiments of the invention.

Reference throughout this specification to "one embodiment," "an embodiment," or similar language means that a particular feature, structure, or characteristic described in connection with the embodiment may be included in at least one embodiment of the invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that embodiments of the invention can be practiced without one or more of the specific details, or with other methods, components, etc. In other instances, well-known structures, or operations are not shown or described in detail to avoid obscuring aspects of embodiments of the invention.

The illustrated embodiments of the invention will be best understood by reference to the drawings, wherein like parts are designated by like numerals throughout. The following description is intended only by way of example, and simply illustrates certain selected embodiments of apparatus, methods, and computer program products.

Figure 1:
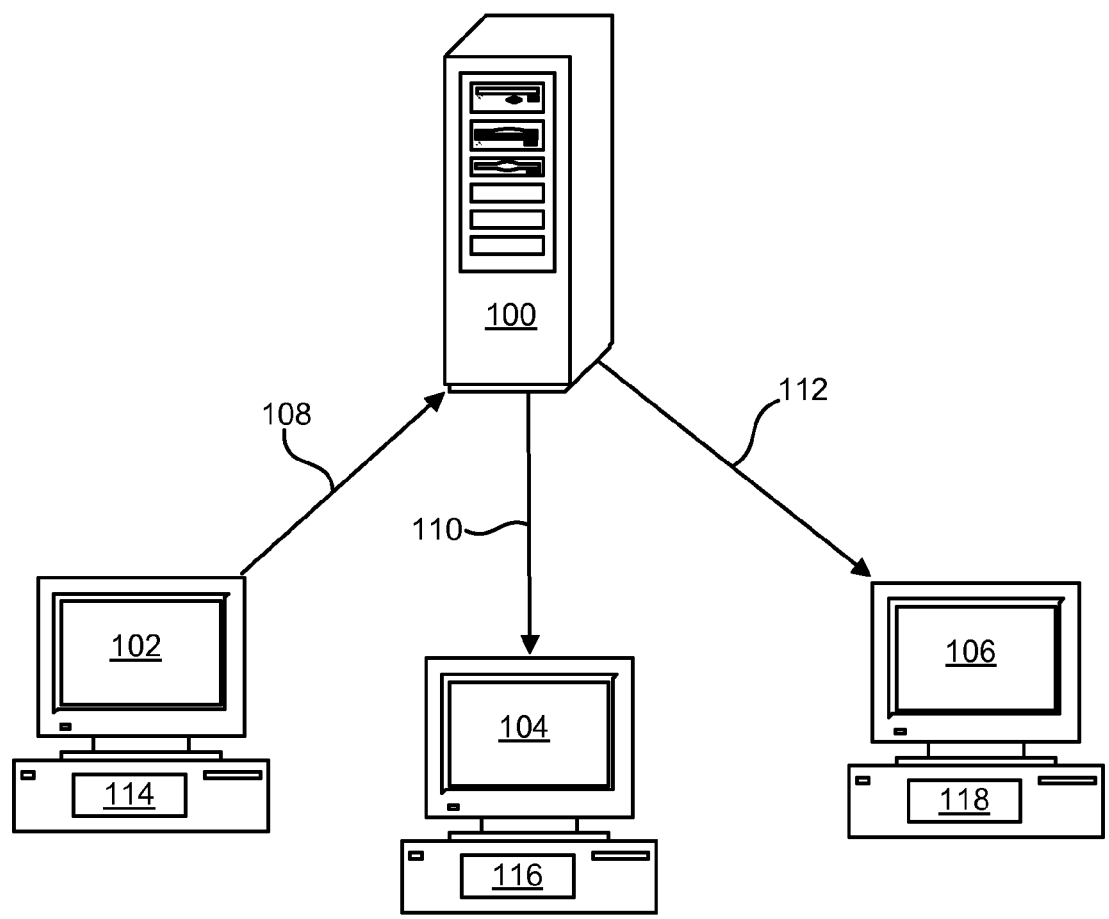
FIG. 1 is a block diagram of a network in accordance with one embodiment of the invention.

FIG. 1 describes a network comprising at least one server 100 and several client machines 102, 104 and 106. Different users may share these client machines 102, 104, 106 under private sessions. This will be described below with respect to an embodiment relating to one user working on different client machines 102, 104 and 106.

The server 100 may generally be a workstation. The client machines 102, 104, 106 may be a personal computer, a laptop or any other device able to connect to a network (not shown). The server 100 may communicate with each client machine 102, 104, 106 through connection lines 108, 110 and 112. The server 100 may also communicate with other networks (not shown) in order to transmit and receive electronic data from other servers via the Internet, for example. Electronic data may include electronic documents and files such as electronic mail messages ("emails"). Each email may include descriptive properties, for example, date of the email, subject of the email, sender, recipient or recipients, etc.

Each client machine 102, 104, 106 may include an archiving module to process the archiving, as will be described below. Each client machine 102, 104, 106 may comprise a hard disk with a specific dedicated location, such as a local archiving folder 114, 116 and 118, respectively, for archiving emails on each client machine 102, 104, 106.

Each client machine 102, 104, 106 may also comprise a local archiving list in order to classify the content of the local archiving folder 114, 116, 118. The content may include emails archived in the archiving folder 114, 116, 118 of a corresponding client machine 102, 104, 106.

In some embodiments, the local archiving list comprises three kinds of descriptive properties. A first descriptive property may relate to the archiving folder 114, 116, 118, such as the path of the folder, size of the folder, etc. A second descriptive property may relate to a date of creation when storing a first email, a date of update when electronic data is subsequently added for archiving in the local archiving folder, a date range of the updates, or a last update date, for example. A third descriptive property may include one or more descriptive properties relating to the email, such as the sender, the recipient, or the subject of the email.

The server 100 may comprise a global archiving list, which includes a replication of each local archiving list, as will be described in more detail below. The global archiving list may enable classification of each archived email on each client machine 102, 104, 106. A process in accordance with one embodiment of the invention may include a number of steps, which will now be described in detail.

Figure 2:
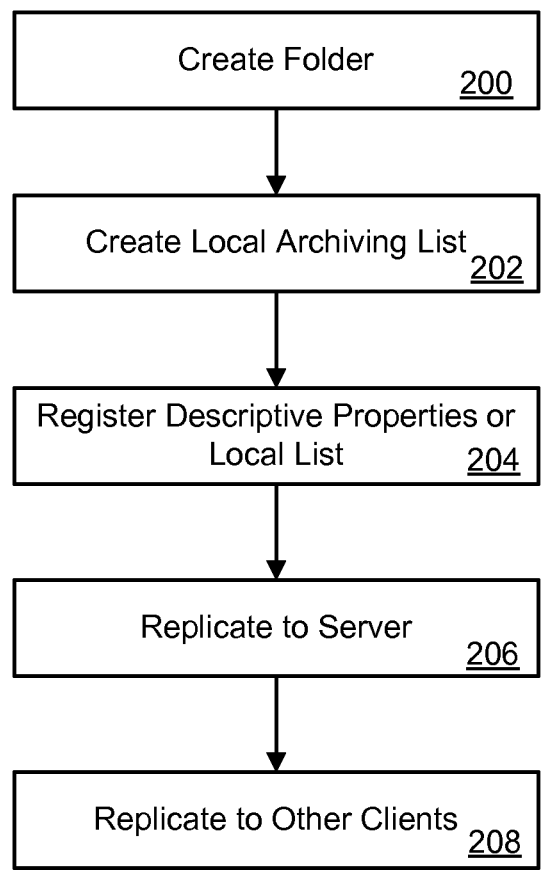
FIG. 2 is a flowchart of the method in accordance with one embodiment of the invention.

As shown in FIG. 2, in an embodiment, a particular client machine 102 may include a first electronic file, or email, to archive. As soon as the client machine 102 launches the archiving of the electronic file, the archiving module 102 may create a specific folder 114 in a step 200 in order to store the email. Then in a step 202, the archiving module may create a local archiving list in order to store information relating to the archived email, such as the descriptive properties mentioned above. Each archiving module of each client machine 102, 104, 106 may create a local archiving list the first time an electronic file or email is archived on the corresponding client machine 102, 104, 106.

In a step 204, the archiving module may register, for example, first, second and third descriptive properties of the archived email in the local archiving list. In some embodiments, as mentioned above, the first descriptive property may refer to the path for the storage location of the email. The second descriptive property may refer to the date of creation of the archiving folder 114, 116, 118, and to the date of archiving the first email. The third descriptive property may refer to the sender, the recipient and the subject of the email.

In a step 206, the archiving module of the client machine 102 may launch a replication of the local archiving list to the server 100. The server 100 may replicate the local archiving list of the client machine 102, 104, 106 and keep the replication of the local archiving list in a global archiving list. As a result, the global archiving list may include the same details as the local archiving list of the client machine 102.

After this replication, in a step 208, the server 100 may replicate the global archiving list on the local archiving list of other client machines 104, 106. This replication on other client machines 104, 106 may allow each client machine 102, 104, 106 to have the same information as the local archiving list of the original client machine 102. This may enable the other client machines 104, 106 to locate the first email stored on the original client machine 102.

Each time an archiving module generates an archiving folder 114, 116, 118 and an archiving list in a client machine 102, 104, 106 when storing an email, the archiving module may launch a replication to the server 100 in order to create the same list in the global archiving list of the server 100. Thus, the server 100 may also store each descriptive property relating to the archived email. When each client machine 102, 104, 106 archives emails, therefore, the server 100 may have a global list with sub-lists comprising local archiving lists of client machines 102, 104 and 106, for example. In addition, each time a client machine 102, 104, 106 archives an email, the server 100 may inform other client machines 102, 104, 106 in order to update their local archiving list.

Figure 3:
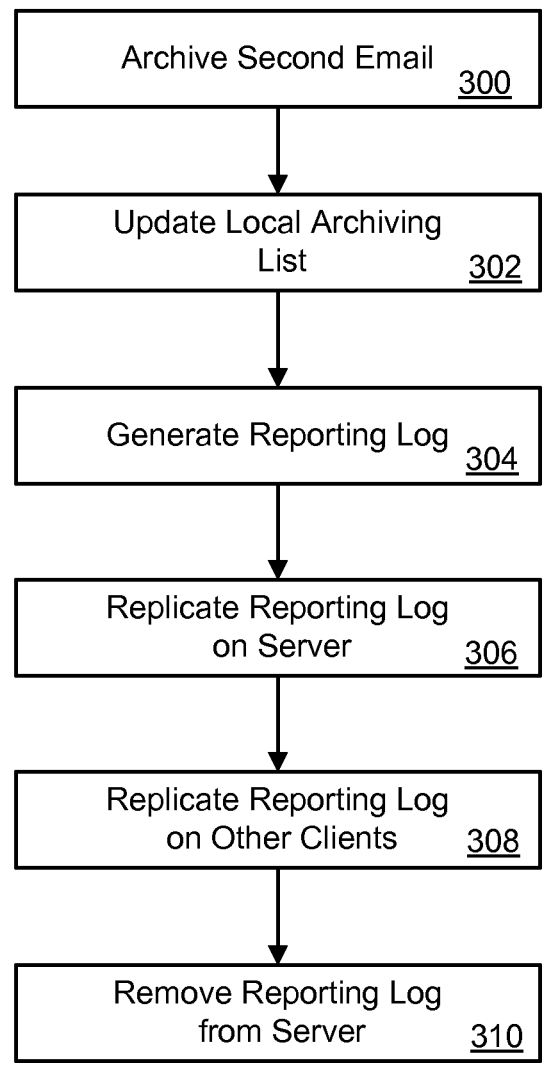
FIG. 3 is a flowchart of the method in accordance with one embodiment of the invention.

As shown in FIG. 3, in an embodiment, a particular client machine 102 may receive a second email to archive. As soon as the archiving module of client machine 102 archives the second email in a step 300, the archiving module may update the local archiving list in a step 302. Thus, the client machine 102 may add second and third descriptive properties of the second email to the local archiving list. The update of the local archiving list for client machine 102 may automatically generate a reporting log in a step 304. The reporting log may contain only the second and third descriptive properties.

To inform the server 100 of such update, the client machine 102 may replicate the reporting log on the server 100 in a step 306. Then, the server 100 may replicate the reporting log and update the global list. When the server 100 replicates the reporting log from client machine 102, the server 100 may update the replication of the local list from client machine 102 in the global list. The server 100 may then create a temporary reporting log only available on the server 100. The temporary reporting log may only contain the second and third descriptive properties of the second email archived in client machine 102.

As soon as a replication of the reporting log is available on the server 100, the server 100 may automatically replicate the reporting log in all client machines 104, 106 other than the original client machine 102 in a step 308. This local replication of the reporting log on each client machine 104, 106 other than the client machine 102 may update local archiving lists of each client machine 104, 106. As soon as the replication is done on all other client machines 104, 106, the server 100 may remove the temporary reporting log in a step 310. Thus, the whole global archiving list may not be replicated, and only the relevant part of the global archiving list, i.e. the reporting log, may be transmitted to other client machines 104, 106.

In operation, a user may only need to read the local archiving list on the current client machine 102 to retrieve an email stored on any machine 102, 104, 106 in communication with the server 100. As the local archiving list of each client machine 102, 104, 106 may comprise replication of the local archiving lists of other client machines 102, 104, 106, the user may be able to exactly determine the location of the searched email, i.e. on the current client machine 102 of the user, or on another remote client machine 104, 106 of that user.

In order to facilitate access to emails stored on distant client machines 104, 106, the method may include additional steps to consolidate emails which refer to the same criteria, such as the same object, the same recipient or the same sender at a same location. Thus, at a defined period, which could be each month, each half-year or each year, for example, an automatic process may gather and consolidate all emails according to a predetermined consolidation profile.

In one embodiment, for example, the predetermined profile may indicate that all emails relating to the same recipient may be consolidated every month at a specific date in a particular client machine 102, referred to as the main client machine 102. Therefore, each month a replication may occur from the other client machines 104, 106 storing emails matching the criteria of the consolidation profile to the main client machine 102. As soon as all emails are replicated in the specific location or folder 114 of the main client machine 102, the replicated emails may be deleted from their original locations in the other client machines 104, 106. Thus, when a user searches for a specific email having the criteria defined in the consolidation profile, the user may search for the email from a single physical location on one client machine 102. The search is therefore more convenient than searching on different client machines 104, 106.

An embodiment may enable a client machine 102 to be informed of the content of different archives located remotely from that client machine 102. The location and the above-mentioned descriptive properties may not be specifically defined and may vary according to the preferences of a user. In an embodiment, the server 100 may be able to direct the user to the exact location of an archived email.

Embodiments of the invention have been described with reference to an email archiving tool. Other embodiments, however, may equally relate to other media, such as voice, video or any other type of information-carrying media which may need to be accessed and searched within an archive.

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium may include any apparatus that may contain, store, communicate, propagate, or transport the program for use by or in connection with the instruction execution system, apparatus, or device.

The medium may be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. A method for archiving electronic files in a network comprising a server and at least two client machines communicating with the server, the method comprising:
   archiving electronic files on a first client machine;
   generating a first local archiving list on the first client machine, the first local archiving list containing a list of electronic files and their locations on the first client machine;
   transmitting the first local archiving list from the first client machine to the server;
   updating a global archiving list on the server using the first local archiving list, the global archiving list containing a list of electronic files and their locations on client machines communicating with the server; and
   transmitting the global archiving list to a second client machine communicating with the server.

2. The method of claim 1, wherein transmitting the global archiving list comprises updating a second local archiving list on the second client machine.

3. The method of claim 1, further comprising updating the first local archiving list in response to changes to the electronic files on the first client machine.

4. The method of claim 3, further comprising transmitting the updated first local archiving list to the server to update the global archiving list.

5. The method of claim 4, further comprising transmitting the updated global archiving list to the second client machine to update the second local archiving list.

6. The method of claim 1, further comprising consolidating, on the first client machine, electronic files archived on the second client machine.

7. A computer program product for archiving electronic files in a network comprising a server and at least two client machines communicating with the server, the computer program product comprising a non-transitory computer-readable storage medium having computer-usable program code embodied therein, the computer-usable program code comprising:
   computer-usable program code for archiving electronic files on a first client machine;
   computer-usable program code for generating a first local archiving list on the first client machine, the first local archiving list containing a list of electronic files and their locations on the first client machine;
   computer-usable program code for transmitting the first local archiving list from the first client machine to the server;
   computer-usable program code for updating list on the server using the first local archiving list, the global archiving list containing a list of electronic files and their locations on client machines communicating with the server; and
   computer-usable program code for transmitting the global archiving list to a second client machine communicating with the server.

8. The computer program product of claim 7, wherein the computer program product is executed on a data processing system.

9. The computer program product of claim 7, wherein transmitting the global archiving list comprises updating a second local archiving list on the second client machine.

10. The computer program product of claim 7, further comprising computer-usable program code for updating the first local archiving list in response to changes to the electronic files on the first client machine.

11. The computer program product of claim 10, further comprising computer-usable program code for transmitting the updated first local archiving list to the server to update the global archiving list.

12. The computer program product of claim 11, further comprising computer-usable program code for transmitting the updated global archiving list to the second client machine to update the second local archiving list.

13. The computer program product of claim 7, further comprising computer-usable program code for consolidating, on the first client machine, electronic files archived on the second client machine.

14. A system for archiving electronic files in a network comprising a server and at least two client machines communicating with the server, the system comprising:
- at least one processor;
- at least one memory device coupled to the at least one processor and storing modules for execution on the at least one processor, the modules causing the at least one processor to:
  - archive electronic files on a first client machine;
  - generate a first local archiving list on the first client machine, the first local archiving list containing a list of electronic files and their locations on the first client machine;
  - transmit the first local archiving list from the first client machine to the server;
  - update a global archiving list on the server using the first local archiving list, the global archiving list containing a list of electronic files and their locations on client machines communicating with the server; and
  - transmit the global archiving list to a second client machine communicating with the server.

15. The system of claim 14, wherein transmitting the global archiving list comprises updating a second local archiving list on the second client machine.

16. The system of claim 14, wherein the modules further cause the at least one processor to update the first local archiving list in response to changes to the electronic files on the first client machine.

17. The system of claim 16, wherein the modules further cause the at least one processor to transmit the updated first local archiving list to the server to update the global archiving list.

18. The system of claim 17, wherein the modules further cause the at least one processor to transmit the updated global archiving list to the second client machine to update the second local archiving list.

19. The system of claim 14, wherein the modules further cause the at least one processor to consolidate, on the first client machine, electronic files archived on the second client machine.

20. The system of claim 14, wherein the first local archiving list further stores, for each electronic file stored on the first client machine, information selected from the group consisting of an archiving folder location, an archiving folder size, a date of creation, a date of update, a sender, a recipient, and a subject.

* * * * *